United States Patent
Bernardinis et al.

(10) Patent No.: US 9,077,243 B2
(45) Date of Patent: Jul. 7, 2015

(54) CURRENT-BALANCING IN INTERLEAVED CIRCUIT PHASES USING A PARAMETER COMMON TO THE PHASES

(75) Inventors: Gabriele Bernardinis, San Jose, CA (US); Marco Soldano, San Jose, CA (US)

(73) Assignee: Analog Devices, Inc., Norwood, MA (US)

( * ) Notice: Subject to any disclaimer, the term of this patent is extended or adjusted under 35 U.S.C. 154(b) by 431 days.

(21) Appl. No.: 13/362,182

(22) Filed: Jan. 31, 2012

(65) Prior Publication Data

US 2013/0194848 A1    Aug. 1, 2013

(51) Int. Cl.
*H02M 3/158* (2006.01)
*H02M 1/00* (2007.01)

(52) U.S. Cl.
CPC .... *H02M 3/1584* (2013.01); *H02M 2001/0003* (2013.01); *H02M 2003/1586* (2013.01)

(58) Field of Classification Search
CPC .................. H02M 3/1584; H02M 2001/0003; H02M 2003/1586
USPC .................... 323/225, 271, 272, 283; 363/126
See application file for complete search history.

(56) References Cited

U.S. PATENT DOCUMENTS

| | | | | |
|---|---|---|---|---|
| 7,068,016 | B2 * | 6/2006 | Athari | 323/222 |
| 7,136,419 | B2 * | 11/2006 | Dress et al. | 375/242 |
| 8,493,754 | B1 * | 7/2013 | Wambsganss et al. | 363/65 |
| 2006/0055388 | A1 * | 3/2006 | Tang et al. | 323/284 |
| 2006/0152205 | A1 * | 7/2006 | Tang et al. | 323/284 |
| 2008/0129260 | A1 * | 6/2008 | Abu Qahouq et al. | 323/272 |
| 2012/0049813 | A1 * | 3/2012 | Huang et al. | 323/272 |

FOREIGN PATENT DOCUMENTS

WO    WO 2011012812 A2 *    2/2011

* cited by examiner

*Primary Examiner* — Jue Zhang
*Assistant Examiner* — Lakaisha Jackson
(74) *Attorney, Agent, or Firm* — Schwegman Lundberg & Woessner, P.A.

(57) ABSTRACT

A method for balancing an electrical parameter (e.g., a current or a voltage) between phases in a multi-phase interleaved circuit includes sensing the electrical parameter, demultiplexing the electrical parameter in accordance with a phase-select signal, sampling the demultiplexed components into a plurality of digital signals, generating an error signal based on a difference between the digital signals, and modulating the phase-select signal, as applied to the phases, in accordance with the error signal.

19 Claims, 5 Drawing Sheets

CURRENT-BALANCING IN INTERLEAVED CIRCUIT PHASES USING A PARAMETER COMMON TO THE PHASES

TECHNICAL FIELD

Embodiments of the invention generally relate to interleaved circuits and, more particularly, to balancing current in circuits having interleaved phases.

BACKGROUND

A multi-phase or "interleaved" electrical circuit performs a function (normally done by a single electrical component or phase) using two or more parallel, duplicate components or phases that are activated at different, sequential points in time. A control or clock signal is divided into time slices and enables a different phase during each time slice; the other phase or phases are disabled. Because the devices of each phase are identical or nearly identical, the output of the interleaved circuit is the same as if it were a single, always-on circuit. For example, a first phase of an interleaved circuit may be enabled when a clock signal is high, and a second phase may be enabled when the clock signal is low; each phase receives the same input and contributes to the same output.

While interleaving may be used in any circuit, a major application of interleaving is in power systems. Interleaved phases reduce the stress that any one individual component experiences (because the component may be active only 50% or less of the time), thereby extending the lifetime and reliability of high-current power circuits. Other circuits, such as AC-to-DC power-factor-correction ("PFC") circuits, which are used to improve the efficiency of power delivered to electronic components, may receive additional benefits from interleaved phases. For example, the increased switching frequency introduced by interleaving may reduce the PFC circuit's input current ripple (thereby simplifying the design of an upstream electromagnetic-interference or "EMI" filter) and reduce the PFC circuit's output current ripple (thereby easing the design requirements of its output capacitor).

One drawback of interleaving is the potential for imbalance among its phases, which may be introduced by differences in the performance of devices in each phase (caused by, for example, manufacturing defects). The asymmetry among the phases may also produce undesirable effects, such as overheating of devices that carry the output voltage or current (such as switches and diodes) and saturation of devices (such as inductors in a boost circuit). Thus, balancing of interleaved phases is important for both accuracy of operation and long-term reliability.

One way to balance the phases in an interleaved circuit is to measure an output current or voltage of each phase and, if there is an imbalance, to vary accordingly the length of time that each phase is active. For example, two interleaved phases may be controlled by a clock having a 50% duty cycle (i.e., the clock signal is high half of the time and low half of the time); the first phase may have "stronger" devices that output 1.1 A of current, and the second phase may have "weaker" devices that output 0.9 A of current. The greater current in the first phase may lead to the first-phase devices wearing out sooner than expected and may saturate and/or overheat other components in the system. To compensate, the duty cycle of the first phase may be reduced to 45% and the duty cycle of the second phase increased to 55%, thereby balancing out the energy (i.e., the product of current and time) produced by the two phases.

Existing systems may sense the output current and adjust the duty cycle of a control signal accordingly, but they do so by introducing multiple sensing and control devices that themselves introduce further discrepancies into the circuit. FIG. 1A, for example, illustrates a DC-to-DC boost converter circuit 100 having three interleaved phases 102. The sum of currents through the inductors 104 is sensed through an input-sensing resistor 106, which provides the output current information to the main control loop 108. In order to adjust the duty cycle of each phase, however, the control loop 108 also requires the sensing of the switch currents 110 of each individual phase. Inconsistencies, defects, etc. in the multiple sensing devices may introduce errors in the calibration of the phases 102, resulting in a mis-calibrated circuit 100. Another example is illustrated in FIG. 1B, in which a PFC correction circuit 150 uses two sensing resistors 152 to sense the currents in two interleaved phases 154 for analysis in a current loop controller 156. Like the above example shown in FIG. 1A, the two sensing resistors 152 may introduce errors in the control of the phases 154 if, for example, one resistor is manufactured with a higher- or lower-than-expected resistance.

Thus, a need exists for a way to calibrate the phases in an interleaved circuit, such as a power or PFC circuit, in such a way that does not introduce errors that undermine the calibration, thereby allowing a more precise balancing of the currents (or other electrical parameter, such as voltage) in each phase.

SUMMARY

A circuit for balancing an electrical parameter (e.g., current or voltage) in multiple phases of a multi-phase interleaved circuit uses only one sensor that is common to every phase and selectively senses the electrical parameter therein using a control signal having the same frequency as the control signal applied to the phases. The information for each phase is reconstructed and balancing is provided based on an analysis of the reconstructed signals. Thus, each interleaved phase provides equal power even with non-matching circuit components such as inductors and switches (specifically, their gate capacitance and on-resistance $R_{DSon}$) and circuit parasitics such as DCR and stray capacitances.

In one aspect, a method for balancing phases in a multi-phase interleaved circuit includes sensing an electrical parameter common to the phases. The electrical parameter is demultiplexed in accordance with a phase-select signal, and the demultiplexed components are sampled into a plurality of digital signals. An error signal based on a difference between the digital signals is generated, and the phase-select signal, as applied to the phases, is modulated in accordance with the error signal.

The electrical parameter may be a current or a voltage. Generating the error signal may include integrating the difference between the digital signals and/or applying a scaling factor to a result of the integration. A first scaling factor may be applied when a duty cycle of the phase-select signal is less than 50% and a second scaling factor may be applied when the duty cycle of the phase-select signal is greater than 50%. Sensing the electrical parameter may include sensing a voltage across a resistor and demultiplexing the electrical parameter may include dividing the electrical parameter into two 180 degree sections. Modulating the phase select signal may include modifying the phase-select signal in only one phase or in more than one phase.

In another aspect, a system for balancing currents between phases in a multi-phase interleaved circuit includes a demultiplexer for dividing an input signal into a plurality of demultiplexed signals in accordance with a phase-select signal, the input signal being an electrical parameter common to the phases. An analog-to-digital converter circuit divides the demultiplexed signals into a plurality of digital signals, and a comparator detects a difference between the plurality of digital signals. A modulator modulates the phase-select signal in accordance with an error signal based at least in part on the detected difference.

The electrical parameter may be a current or a voltage. An integrator may integrate the detected difference prior to its use by the modulator, and a scaler may apply a scaling factor to a result of the integration prior to its use by the modulator. The analog-to-digital converter circuit may include a plurality of analog-to-digital converters; each analog-to-digital converter may include a sigma-delta analog-to-digital converter. The phases may include two phases, and the multi-phase interleaved circuit may include a multi-phase power-factor correction circuit.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Described herein are various embodiments of methods and systems for balancing an electrical parameter (e.g., current or voltage) in an interleaved circuit based on a digital-control technique that uses only one sensing point. In accordance herewith, the sum of the currents of the interleaved phases is sensed instead of the individual switching currents. The sensed current, in the form of a voltage, is converted into a digital value using analog-to-digital converters (e.g., sigma-delta analog-to-digital converters). In this way, imbalance of the phase currents caused by several factors (e.g., inductance mismatch and duty cycle mismatch) may be corrected.

In an interleaved electrical circuit (such as a power-factor-correction or "PFC" circuit), several factors may affect the current balancing between the interleaved phases. Equation (1) defines one example of the difference in current that may occur between two phases (in a two-phase interleaved circuit), wherein $i_1$ and $i_2$ are the currents in each phase, $Z_{L1}$ and $Z_{L2}$ are the impedances of each stage, $d_1$ and $d_2$ are the duty cycles (i.e., time slices) applied to each stage, $I_{in}$ is the input current, and $V_O$ is the output voltage.

$$i_1 - i_2 = \frac{I_{in} \cdot (Z_{L2} - L_{L1})}{Z_{L1} + Z_{L2}} + \frac{2 \cdot (d_1 - d_2) V_O}{Z_{L1} - Z_{L2}} \quad (1)$$

Equation (1) shows that inductance, direct-current resistance ("DCR"), and duty-cycle differences may cause a non-zero difference between the phase currents $i_1 - i_2$. To eliminate or reduce the current imbalance, the duty cycle (that in a balanced and perfectly matched situation is the same for the two phases) may be unbalanced accordingly. The active-balancing control approach described herein unbalances the two duty-cycles by a quantity that varies depending on the specific value of the duty cycle D(t) at the instant in time t determined by a control-loop output and digital PWM logic. The sum of the switch currents is sensed and the difference between them is reconstructed in the digital domain; the circuit then compensates for the difference by adjusting the duty cycle (i.e., making it greater or smaller).

Figure 1A:
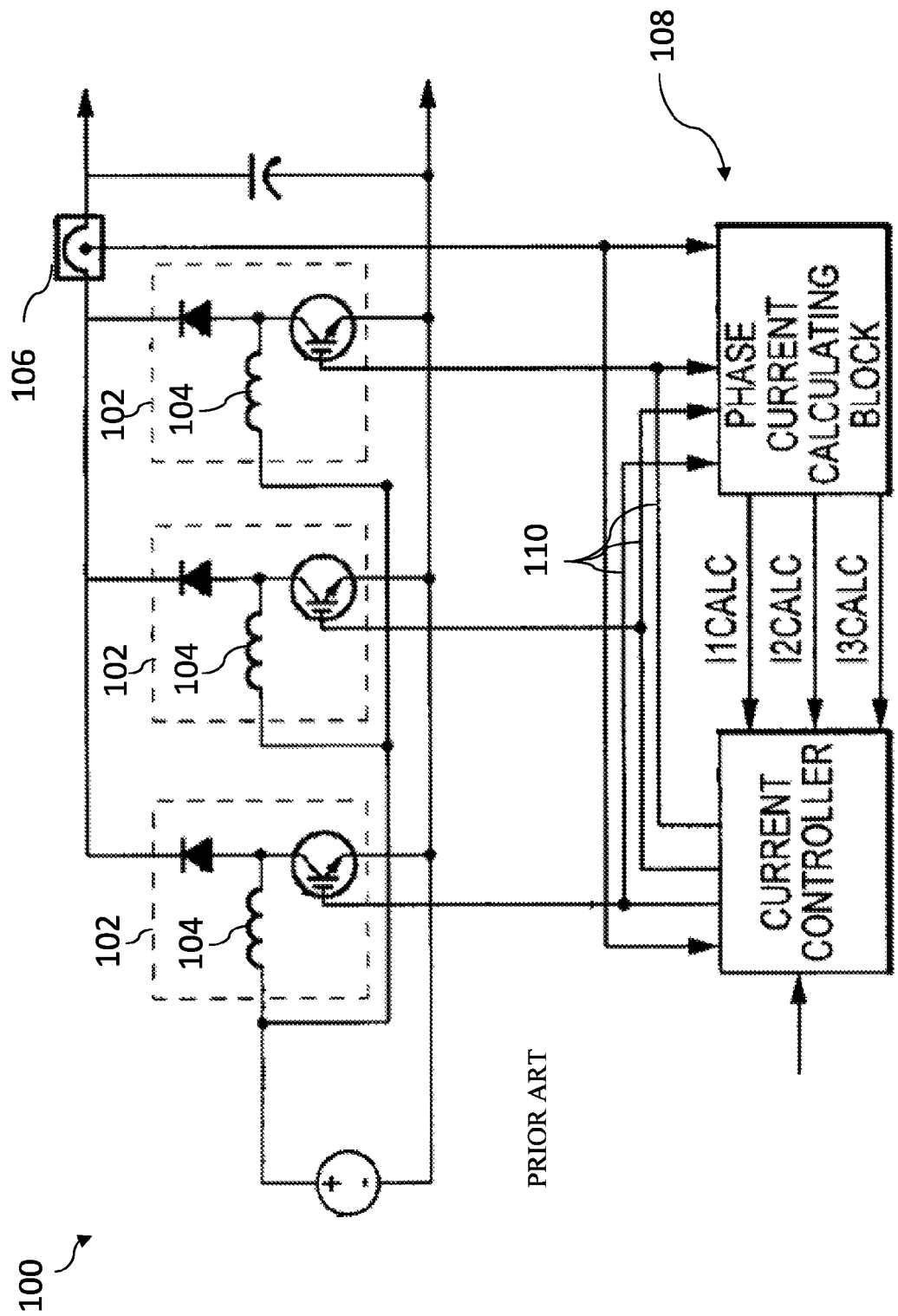
FIG. 1A illustrates a conventional DC-to-DC three-phase time-interleaved boost converter.
Figure 1B:
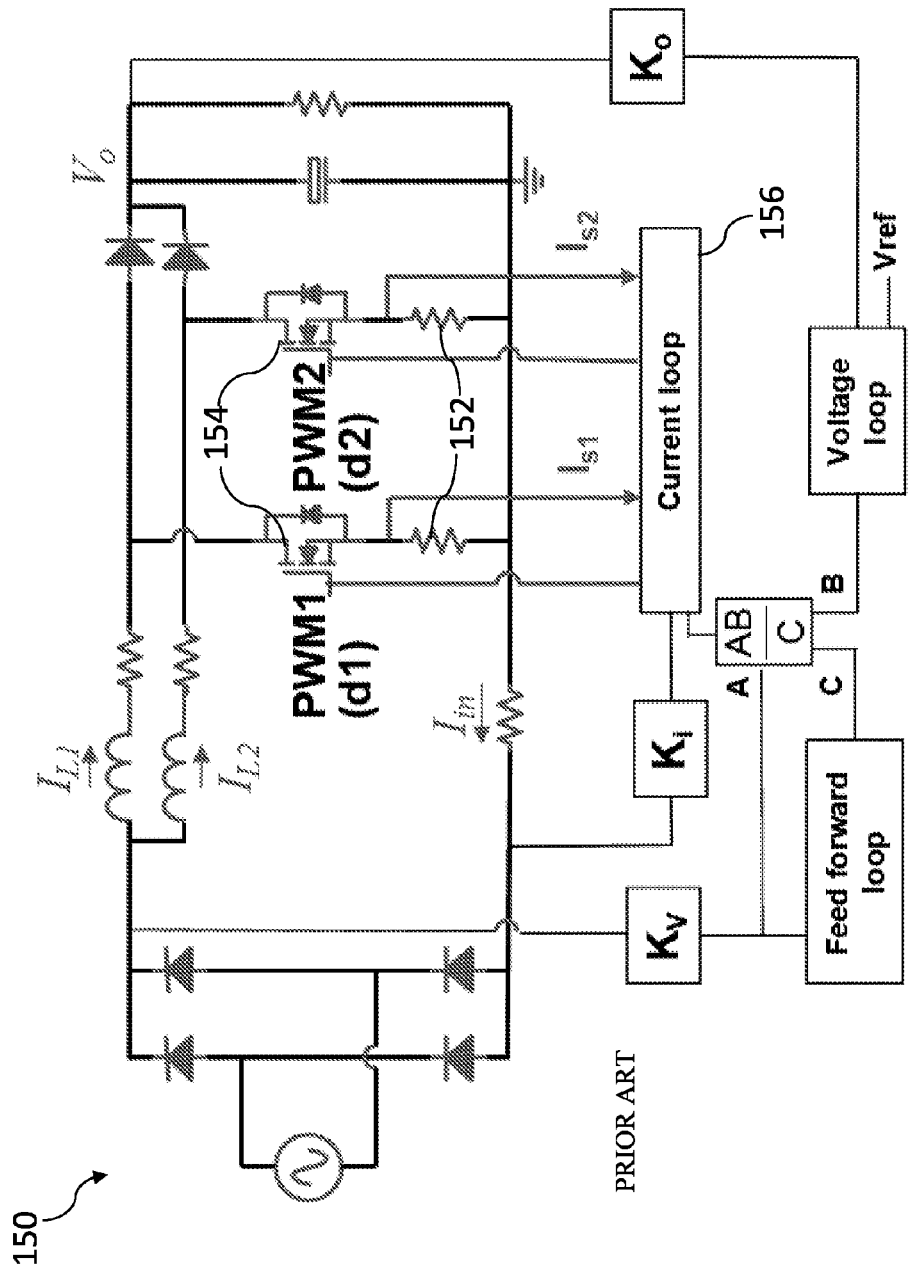
FIG. 1B illustrates a conventional PFC circuit having a current-balancing circuit.
Figure 2:
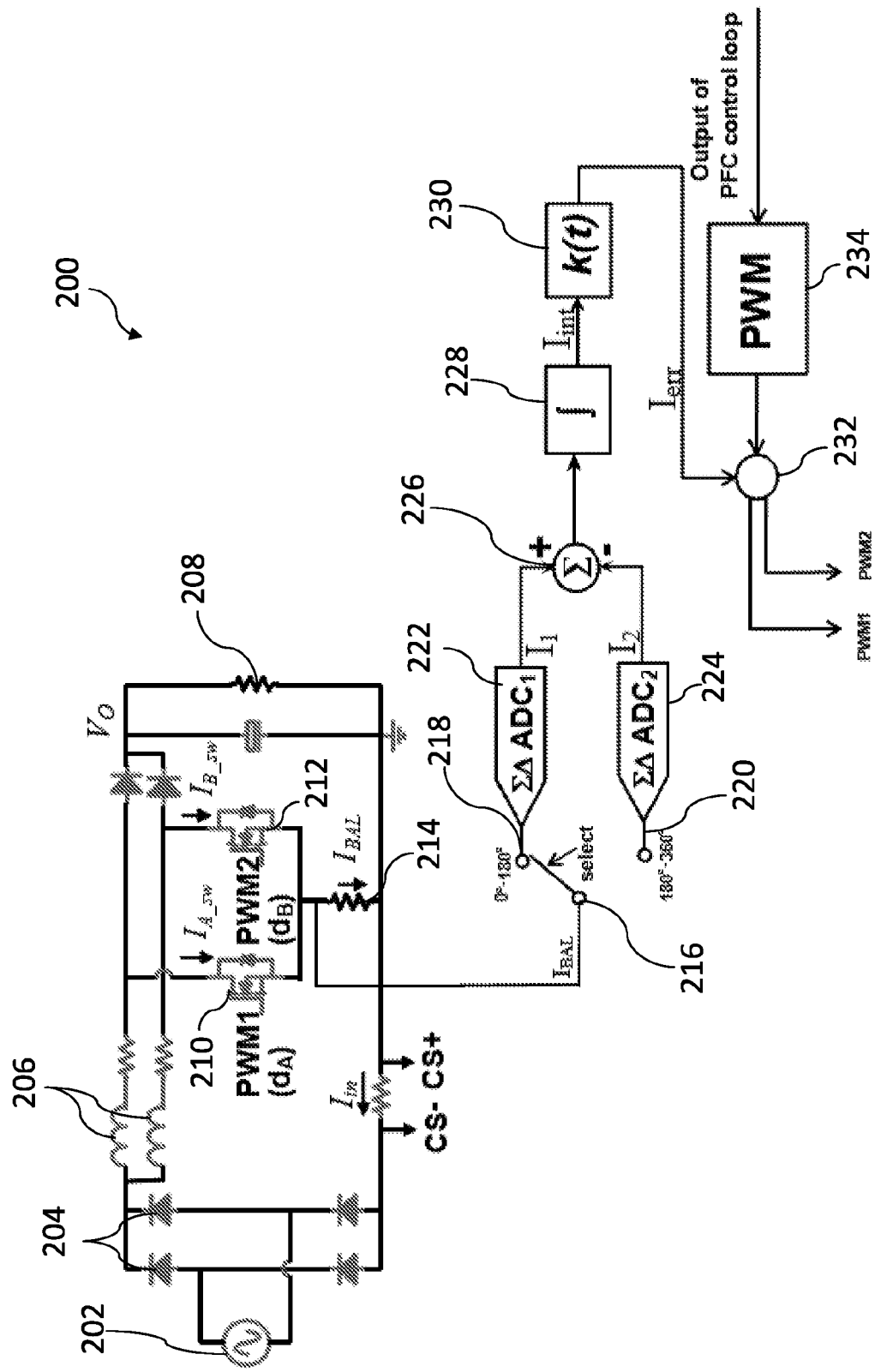
FIG. 2 illustrates a current-balancing circuit in accordance with an embodiment of the invention.

One embodiment of a current-balancing circuit 200 configured in accordance with the current invention is shown in FIG. 2. The circuit 200 is a two-phase interleaved PFC circuit, but the current invention is not limited to any particular type of interleaved circuit, and any circuit that divides its function between parallel circuits, in accordance with a control or clock signal, is within the scope of the current invention. The power-factor-correction circuitry includes an AC power source 202, rectifier diodes 204, inductors 206, and an output load 208. The output load 208 develops an output voltage $V_O$ and draws a current $I_{in}$ from the source 202. Two switches 210, 212 (implemented using MOSFETs in the current embodiment) enable first and second phases of operation and are controlled by first and second pulse-width modulation signals $PWM_1$ and $PWM_2$. A current sensor 214 senses the sum $I_{BAL}$ of the currents $I_{A\_SW}$, $I_{B\_SW}$ through both switches 210, 212

The sum $I_{BAL}$ of the currents of the switches 210, 212 is applied to a demultiplexer 216, which divides the sum $I_{BAL}$ into two or more time-based components. In the case of a two-phase interleaved circuit, the demultiplexer 216 divides the sum $I_{BAL}$ into a first component 218 that includes approximately 0° to 180° of the sum $I_{BAL}$ and a second component 220 that includes approximately 180° to 360° of the sum $I_{BAL}$. The demultiplexer may be controlled by a select line that switches at the same frequency as the phase-select signal (i.e., the pulse-width modulation signal). For example, if the phase-select signal enables the first control signal $PWM_1$ for 5 μs, the second control signal $PWM_2$ for the following 5 μs, the first control signal $PWM_1$ again for the next 5 μs, and so on, the select signal for the demultiplexer 216 switches at the same rate (i.e., the first component 218 for 5 μs, the second component 220 for the next 5 μs, and so on). If the times of the control signals $PWM_1$, $PWM_2$ are adjusted away from a 50-50% duty cycle, as described in more detail below, the demultiplexer 216 may continue to receive a signal having a 50-50% duty cycle. If the circuit 200 includes more than two phases, the demultiplexer 216 may divide the sum $I_{BAL}$ into a number of equal-sized components corresponding to the number of phases (or the number of phases requiring balancing).

Figure 3:
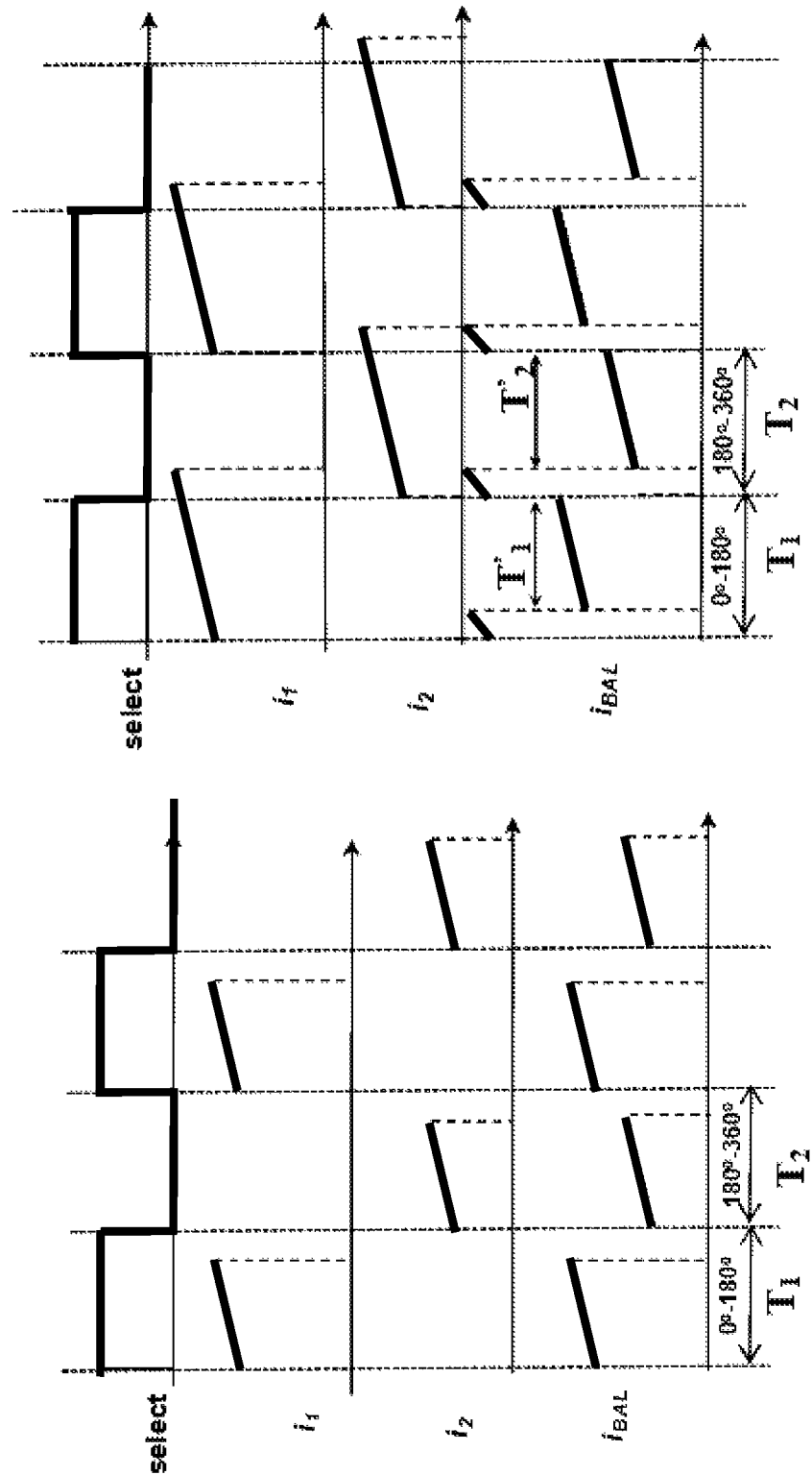
FIGS. 3A and 3B illustrates exemplary waveforms of switch currents and their sums in accordance with an embodiment of the invention.

FIGS. 3A and 3B show the operational waveforms of the phase currents $i_1$, $i_2$ going through the demultiplexer 216 and the sum of the switch current $I_{BAL}$, within a switching period for two cases in which the duty cycle of the phase currents $i_1$, $i_2$ is less than 50% (FIG. 3A) and greater than 50% (FIG. 3B), respectively. The two cases are analyzed differently, as explained in more detail below. The switching period, in the case of a two-phase interleaved circuit, is divided into two parts: $T_1$ (0° to 180°) and $T_2$ (180° to 360°). The magnitudes of the two phases $T_1$, $T_2$ are given by Equation (2), below, in which $T_{sw}$ is the switching period of the single phase of the interleaved converter (i.e., the switching phase of $PWM_1$ or $PWM_2$).

$$T_1 = T_2 = \frac{T_{SW}}{2} = \frac{1}{2 \cdot f_{SW}} \quad (2)$$

During each period $T_1$, $T_2$, the demultiplexer 216 feeds its output to one of a plurality of analog-to-digital converters (for example, to a first converter 222 in the first phase $T_1$ and to a second converter 224 in the second phase $T_2$). In general, there is one analog-to-digital converter for each phase of the circuit 200. In one embodiment, the analog-to-digital converters are sigma-delta analog-to-digital converters; in a particular implementation, they are one-bit sigma-delta modulators, and they sample the current input $I_{BAL}$ at a sample frequency much greater than the switching frequency (i.e., $f_s \gg f_{sw}$). The current invention is not limited to any particular kind of analog-to-digital converter, however. The analog-to-digital converters 222, 224 may be matched to minimize any differences in their performance.

In another embodiment, the demultiplexer 216 is a digital demultiplexer (i.e., multiplexer functionality implemented in the digital domain). In this embodiment, a single Nyquist-type analog-to-digital converter may be used to sample the current input $I_{BAL}$ at the same rate as the sigma-delta analog-to-digital converters described above. The size of the Nyquist converter may be greater than the size of two sigma-delta converters.

The outputs $I_1$, $I_2$ of the two analog-to-digital converters 222, 224 may thus represent the currents in the two phases of the multi-phase circuit 200, and may be examined for differences between them. The circuit 200 implements one method of comparing the outputs $I_2$, but the current invention is not limited to any particular method. In one embodiment, the outputs $I_1$, $I_2$ are fed into a differentiator 226, integrated using an integrator 228, and scaled with a scaler 230 using a duty-cycle-dependent scaling factor. The output of the differentiator 226, integrator 228, and scaler 230 (or equivalent circuits or components) is an error signal $I_{err}$. The scaler 230 may be used to improve and/or guarantee the stability of the system 200 by scaling the error signal $I_{err}$ to a lower value.

The differentiator 226, integrator 228, and scaler 230 may be implemented using any kind of digital logic known in the art, and they may be discrete components or combined into a single component. In another embodiment, they are implemented as software modules running on a general-purpose or digital-signal processor. In one embodiment, the scaler 230 applies a scaling factor k by dividing the output $I_{int}$ of the integrator 228 by the factor k. The division may be performed by a digital divider; the accuracy of the division may be adjusted by scaling the number of bits used in the division. In another embodiment, the division uses a signal proportional to 1−d(nT) and d(nT) for d>50% and d<50%, respectively, instead of the K factor, as explained in greater detail below.

In one embodiment, the integrator 228 is reset at certain times (such as, e.g., the beginning or end of each phase). If the load 208 changes over time (i.e., it is a transient load), a current imbalance may develop between phases because the magnitude of the correction factor may change in accordance with the changing load. The reset of the integrator 228 may prevent an out-of-date correction factor from inducing a temporary but substantial current imbalance that might lead to inductor saturation (or other causes of system failure).

The feedback loop may be closed by applying the error signal $I_{err}$ to a modulator 232, thereby modulating the switching duty cycle 234 to generate the pulse-width modulation signals $PWM_1$, $PWM_2$ used in the phases of the circuit 200, as described above.

In one embodiment, for a two-phase circuit, when the duty cycle is less than 50%, the sum of the switch current, $I_{BAL}$, is $$I_{BAL} = I_{A_{SW}} = I_1(0° \sim 180°) \quad (3a)$$

$$I_{BAL} = I_{B_{SW}} = I_2(180° \sim 360°) \quad (3b)$$

where $I_1$ and $I_2$ are the output values of the sigma-delta converters 222, 224, respectively, during the two phases $T_1$ and $T_2$. When the duty cycle d(t) is less than 50%, the currents $I_{A\_sw}$ and $I_{B\_sw}$ through the respective switches coincide with the converted value of the outputs $I_1$ and $I_2$ (as illustrated in FIG. 3A).

With reference again to FIG. 2, from 0 to 180 degrees of the switching period, the sum current $I_{BAL}$ is applied to the first sigma-delta converter 222, and from 180 to 360 degrees of the switching period, the sum current $I_{BAL}$ is applied to the second sigma-delta converter 224. The digital integrator 228 thus adds the bits coming from the first sigma-delta converter 222 and subtracts the bits coming from the second sigma-delta converter 224. The value integrated by the integrator 228 during one switching cycle may be written as the difference between two integrals:

$$I_{int} = I_{1_{int}} = I_{2_{int}} \quad (4)$$

where in first approximation, $$I_{1_{int}}(t) = \frac{I_{A_{max}} + I_{A_{min}}}{2} d(t)T = I_{A_{ave}} d(t)T \quad (5a)$$

$$I_{2_{int}}(t) = \frac{I_{B_{max}} + I_{B_{min}}}{2} d(t)T = I_{B_{ave}} d(t)T \quad (5b)$$

and $$I_{int}(t) = (I_{A_{ave}} - I_{B_{ave}}) d(t)T \quad (6)$$

where d(t) is the switching duty cycle of both PWMs determined by the control loop 234 before the duty cycle is modified by the modulator 232.

The duty cycle may be updated every switching cycle. In the particular PFC boost converter application illustrated in FIG. 2, the input 202 of the converter 200 is a rectified sine wave; consequently, it may vary constantly from cycle to cycle and thus may be more correctly represented as a discrete time variable d(nT). Therefore, the duty cycle d(t) may be compensated every switching cycle to prevent a time-variable gain from developing in the current-balancing loop, which in turn would result in a input-amplitude dependent low-pass filter frequency of the integrator 228. Note, however, that in other embodiments, the duty cycle may be updated less frequently; the current invention is not limited to any particular rate of updating. In the current embodiment, the error signal $I_{err}$ is divided by the instantaneous duty cycle value d resulting in:

$$I_{err}(nT) = (I_{A_{ave}} - I_{B_{ave}}) = \frac{I_{int}}{d(nT)} \quad (7)$$

The error signal may be computed differently when d>50% (as shown in FIG. 3B). In one embodiment, $I_{A\_ave}$ and $I_{B\_ave}$ are integrated only during the time when they are respectively the only currents flowing through the sensing resistance 214 (i.e., times T'$_1$ and T'$_2$ shown in FIG. 3B). In another embodiment, $I_{A\_ave}$ and $I_{B\_ave}$ are integrated over the full times T$_1$ and T$_2$ in accordance with the below explanation; this embodiment may be simpler and more space-effective, especially at high switching frequencies and when the duty cycle value d(t) is close to one at least because the need for fast blanking of the input signal and/or the need for a high-speed, high-resolution ADC is reduced or eliminated.

Assuming that during d(t)>50% (as shown in FIG. 3B), and noting that the equivalences in Equations (3A) and (3B) are no longer valid, the values integrated during T$_1$ and T$_2$ may be written respectively as:

$$I_{1_{int}}(nT) = (I_{A_{ave}} + I_{B_{ave}})\left(d(nT) - \frac{1}{2}\right)T + I_{A_{ave}}(1 - d(nT))T \quad (8)$$

and $$I_{2_{int}}(nT) = (I_{A_{ave}} + I_{B_{ave}})\left(d(nT) - \frac{1}{2}\right)T + I_{B_{ave}}(1 - d(nT))T \quad (9)$$

The resulting value integrated during a switching period T may then be:

$$I_{int}(nT) = (I_{A_{ave}} - I_{B_{ave}})(1 - d(nT))T \quad (10)$$

And the error signal fed back into the balancing loop is equal to:

$$I_{err}(nT) = (I_{A_{ave}} - I_{B_{ave}}) = \frac{I_{int}}{(1 - d(nT))T} \quad (11)$$

And the gain factor k (applied by the scaler 230 in FIG. 2) is thus:

$$k = \begin{cases} \frac{G}{1 - d(nT)} & (d > 50\%) \\ \frac{G}{d(nT)} & (d < 50\%) \end{cases} \quad (12)$$

where G is a gain coefficient used to program the bandwidth of the balancing loop.

The error signal $I_{err}$ may thus be interpreted as a duty-cycle correction term (i.e., a delta PWM), that may be (for example) subtracted from the first pulse-width modulation signal PWM$_1$ and added to the second pulse-width modulation signal PWM$_2$ (or vice versa) to establish a balanced average current through the inductors 206. The error factor $I_{err}$ may be added or subtracted from only PWM$_1$ for a single-ended implementation.

Figure 4:
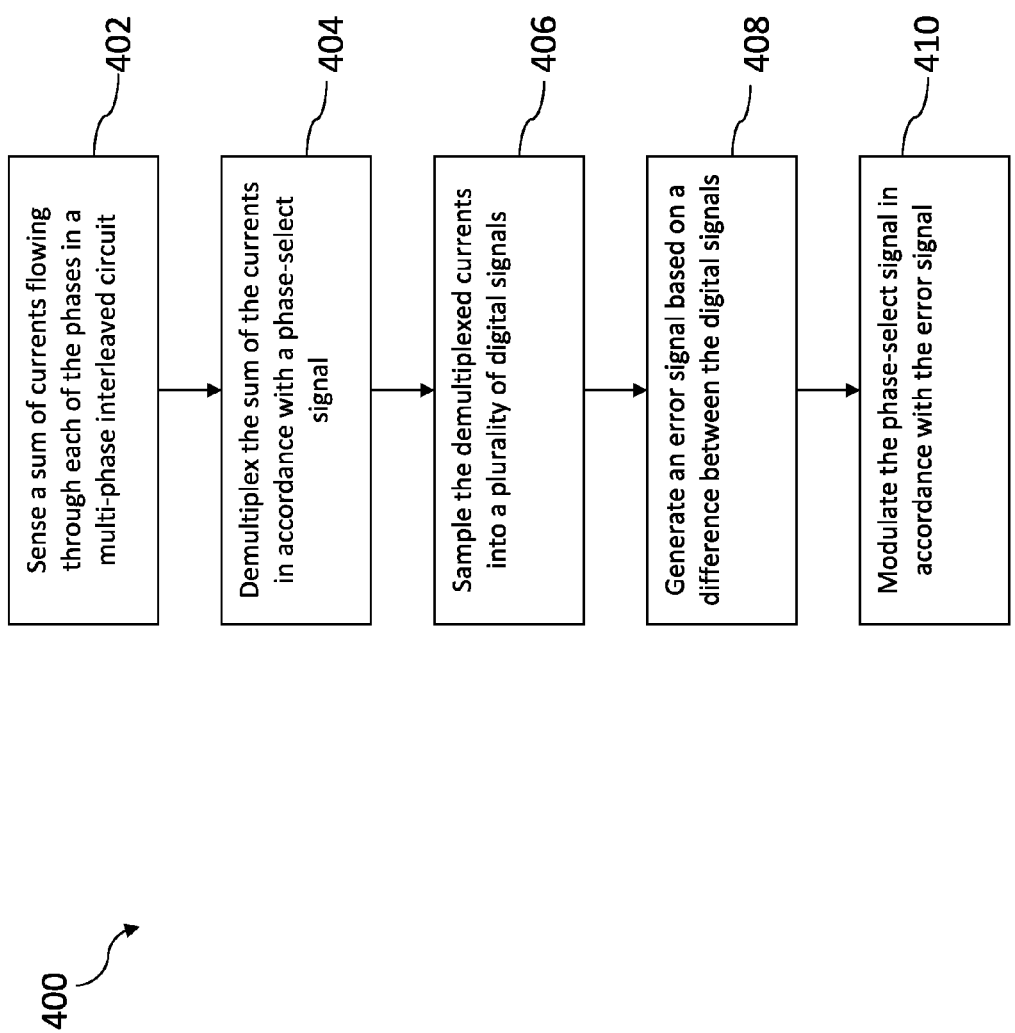
FIG. 4 illustrates a flowchart of a method for balancing current in a multi-phase circuit in accordance with an embodiment of the invention.

A method 400 for balancing currents between phases in a multi-phase interleaved circuit is shown in FIG. 4. In a first step 402, a sum $I_{BAL}$ of the currents $I_{A\_SW}$, $I_{B\_SW}$ flowing through each of the phases 210, 212 in the circuit (e.g., the circuit 200 as shown in FIG. 2) is sensed. In a second step 404, the sum $I_{BAL}$ of the currents is demultiplexed (using, for example, the switch 216) in accordance with a phase-select signal. In a third step 406, the demultiplexed components are sampled into a plurality of digital signals, and in a fourth step 408, an error signal $I_{err}$ is generated based on a difference between the digital signals. In a fifth step 410, the phase-select signal is modulated, as applied to the phases, in accordance with the error signal.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for balancing phases in a multi-phase interleaved circuit, the method comprising:
   sensing an electrical parameter for each of multiple signal phases using a sense element that is common to the circuit phases;
   demultiplexing the electrical parameter, in accordance with a phase-select signal, into demultiplexed signal components that respectively correspond to the multiple signal phases;
   sampling the demultiplexed signal components into a plurality of digital signals that respectively correspond to the multiple signal phases;
   generating an error signal using a digital integrator to integrate a difference between the digital signals; and
   modulating the phase-select signal, as applied to the circuit phases, in accordance with the generated error signal.

2. The method of claim 1, wherein sensing the electrical parameter includes sensing a current signal for each of the multiple signal phases using the sense element.

3. The method of claim 1, wherein the sensing the electrical parameter includes sensing a voltage signal for each of the multiple signal phases using the sense element.

4. The method of claim 2, wherein generating the error signal comprises applying a scaling factor to a result of the integration.

5. The method of claim 4, further comprising applying a first scaling factor when a duty cycle of the phase-select signal is less than 50% and applying a second scaling factor when the duty cycle of the phase-select signal is greater than 50%.

6. The method of claim 4, wherein the generating the error signal comprises applying a duty-cycle-dependent scaling factor to the result of the integration.

7. The method of claim 1, wherein demultiplexing the electrical parameter comprises dividing the electrical parameter into two 180 degree sections.

8. The method of claim 1, wherein modulating the phase select signal comprises modifying the phase-select signal as applied to only one circuit phase.

9. The method of claim 1, wherein modulating the phase select signal comprises modifying the phase-select signal as applied to more than one circuit phase.

10. The method of claim 1, wherein sensing the electrical parameter comprises sensing a voltage across a resistor.

11. A system for balancing phases in a multi-phase interleaved circuit, the system comprising:
- a demultiplexer for dividing an input signal into a plurality of demultiplexed signals in accordance with a phase-select signal, the input signal being an electrical parameter sensed using a sense element that is common to the circuit phases;
- an analog-to-digital converter circuit for converting the demultiplexed signals into a plurality of respective digital signals;
- a comparator for detecting a difference between the plurality of digital signals;
- an integrator that receives information about the detected difference between the plurality of digital signals and, in response, provides an integration signal; and
- a modulator for modulating the phase-select signal in accordance with an error signal that is based at least in part on the integration signal.

12. The system of claim 11, wherein the electrical parameter is a current or a voltage that is sensed using the sense element.

13. The system of claim 11, wherein the integrator comprises a reset input that, when activated, zeroes the integrator.

14. The system of claim 11, wherein the analog-to-digital converter circuit comprises a plurality of analog-to-digital converters.

15. The system of claim 14, wherein each analog-to-digital converter comprises a sigma-delta analog-to-digital converter.

16. The system of claim 11, wherein the circuit phases comprise two circuit phases.

17. The system of claim 11, wherein the multi-phase interleaved circuit comprises a multi-phase power-factor correction circuit.

18. The system of claim 11, further comprising a scaler for applying a scaling factor to the integration signal prior to its use by the modulator.

19. The system of claim 18, wherein the scaler is configured to apply a duty-cycle-dependent scaling factor to the integration signal prior to its use by the modulator.

* * * * *